(12) United States Patent
Guo et al.

(10) Patent No.: US 11,067,480 B2
(45) Date of Patent: Jul. 20, 2021

(54) HALF-CAR FLOATING DEVICE BASED ON LOAD FEEDBACK AND HALF-CAR POSITION TRACKING METHOD

(71) Applicant: Hunan University of Science and Technology, Hunan (CN)

(72) Inventors: Yong Guo, Hunan (CN); Zhewu Chen, Hunan (CN); Ningke Tong, Hunan (CN); Juchuan Dai, Hunan (CN); Shuyi Yang, Hunan (CN); Qihui Ling, Hunan (CN); Hongzhou Li, Hunan (CN)

(73) Assignee: Hunan University of Science and Technology, Xiangtan (CN)

( * ) Notice: Subject to any disclaimer, the term of this patent is extended or adjusted under 35 U.S.C. 154(b) by 238 days.

(21) Appl. No.: 16/236,632

(22) Filed: Dec. 30, 2018

(65) Prior Publication Data

US 2019/0391048 A1    Dec. 26, 2019

(30) Foreign Application Priority Data

Jun. 21, 2018   (CN) .......................... 201810640835.1

(51) Int. Cl.
  *G01M 17/04* (2006.01)
(52) U.S. Cl.
  CPC .................................. *G01M 17/04* (2013.01)
(58) Field of Classification Search
  CPC ........ G01M 17/04; G01M 13/00; H02K 7/10; H02P 23/24; H02P 27/04; G01B 21/26
  USPC .......... 73/669, 670, 117.01, 117.02, 117.03, 73/116.01
  See application file for complete search history.

(56) References Cited

U.S. PATENT DOCUMENTS 3,937,058 A * 2/1976 Hilbrands .............. B60G 17/06
                                                    73/11.08
4,263,809 A * 4/1981 Petersen ............. G01M 13/027
                                                    73/116.01
(Continued)

FOREIGN PATENT DOCUMENTS

CN         201867297 U      6/2011
CN         104502125 B      8/2015
(Continued)

*Primary Examiner* — Eric S. McCall
*Assistant Examiner* — Timothy P Graves

(57) ABSTRACT

Disclosed is a half-vehicle floating device and a half-vehicle position tracking method based on load feedback. The device includes a rack, an active platform, a position-measuring triangle frame and a position-measuring platform. Guide rails corresponding to the active platform and the position-measuring platform are provided vertically on the rack. The active platform and the position-measuring platform are respectively placed on a corresponding rail through a slider. The bottom of the active platform is hinged to a first corner of an active triangle frame through an active slider rod, and a second corner of the active triangle is hinged to the rack and connected to an inverter motor through a transmission device. The bottom of the position-measuring platform is hinged to a first corner of the position-measuring triangle frame through a position measuring slider rod, and a second corner of the position-measuring triangle frame is hinged to the rack.

9 Claims, 7 Drawing Sheets

(56) References Cited

U.S. PATENT DOCUMENTS 7,174,776 B2 * 2/2007 Temkin ............... G01M 17/007
                                                                                         73/117.01
2007/0118258 A1    5/2007 Probst et al.

FOREIGN PATENT DOCUMENTS

| CN | 106644529 A | 5/2017 |
| CN | 206387587 U | 8/2017 |

\* cited by examiner

HALF-CAR FLOATING DEVICE BASED ON LOAD FEEDBACK AND HALF-CAR POSITION TRACKING METHOD

CROSS-REFERENCE TO RELATED APPLICATIONS

This application claims the benefit of priority from Chinese Patent Application No. 201810640835.1, filed on Jun. 21, 2018. The content of the aforementioned application, including any intervening amendments thereto, is incorporated herein by reference in its entirety.

TECHNICAL FIELD

The invention relates to the technical field of the test device for vibration damping performance of a heavy vehicle suspension system, in particular to a half-vehicle floating device based on load feedback and a half-vehicle position tracking method.

BACKGROUND

The performance of vehicle suspension system has an important influence on improving the comfort of the vehicle, reducing the noise in the vehicle and prolonging the service cycle of the vehicle. The key technologies of suspension, such as vehicle suspension parameter optimization and control strategy selection, need to be verified by performance experiments. Most of the existing suspension experiments use ¼ vehicle models or a whole vehicle loading experiments, but the suspension performance results of the ¼ vehicle model deviate significantly with respect to actual situation, and the vehicle loading platform is expensive, especially for heavy vehicles.

The performance test of the suspension system when half of a whole vehicle is loaded is an effective method to solve the contradiction and ensure the accuracy and economy of the performance test of the heavy vehicle suspension system. However, to guarantee the position tracking of the other half when half of the vehicle is loaded is a major challenge to the realization of the method. In light of the problem, Patent ZL201410828974.9 puts forward a performance test method of suspension system which can be loaded by re-building the half-vehicle model, only simulates the performance test of the half-vehicle suspension system, and cannot realize the load suspension test of the half-vehicle of a real vehicle. The half-vehicle position tracking technology is the key technology to ensure successful development of the test of the suspension performance of the half-vehicle of a real vehicle.

SUMMARY

In order to solve the above problems, the invention provides a method to ensure the realization of the performance test method of the suspension system when half of a heavy vehicle is loaded, and a half-vehicle floating device based on load feedback to ensure the accuracy and economy of the test results and a method of position tracking when loading a half of a real vehicle by excitation using the device.

The invention employs a half-vehicle floating device based on load feedback, comprising a rack, an active triangle frame, an active platform, guide rails, a position-measuring triangle frame and a position-measuring platform. The guide rails corresponding to the active platform and the position-measuring platform are provided vertically on the rack. The active platform and the position-measuring platform are respectively placed on a corresponding rail through a slider.

The bottom of the active platform is hinged to an upper end of an active slider rod. A lower end of the active slider rod is hinged to a first corner of the active triangle frame. A second corner of the active triangle frame is hinged to the rack and connected to an inverter motor through a transmission device. The bottom of the position-measuring platform is hinged to an upper end of a position-measuring slider rod. A lower end of the position-measuring slider rod is hinged to a first corner of the position-measuring triangle frame, and a second corner of the position-measuring triangle frame is hinged to the rack. A third corner of the active triangle frame is hinged to an end of a pull rod, and the other end of the pull rod is hinged to a third corner of the position-measuring triangle frame. A plurality of weighing sensors is provided on the position-measuring platform.

According to the half-vehicle floating device based on load feedback as described above, the plurality of weighing sensors is arranged evenly in the middle of the position-measuring platform.

According to the half-vehicle floating device based on load feedback as described above, the transmission device includes a flange, a power transfer shaft and a right-angled reducer. The flange is mounted at the second corner of the active triangle frame. One end of the power transfer shaft is connected to the flange and the other end is connected to the output shaft of the right-angled reducer. The input shaft of the right-angled reducer is connected to the inverter motor.

According to the half-vehicle floating device based on load feedback as described above, a pair of grooves is provided on the flange, and a pair of grooves is provided correspondingly on the end of the power transfer shaft towards the active triangle frame. The power transfer shaft is connected to the flange through a power transfer mass which is arranged in the grooves of the flange and the power transfer shaft.

According to the half-vehicle floating device based on load feedback as described above, the right-angled reducer and the inverter motor are mounted on a base of an active platform. The bottom of the base of the active platform is fixed at the bottom of the rack. The guide rails are linear ball guide rails and the inverter motor is an inverter motor with brakes.

The invention also relates to a half-vehicle position tracking method using the half-vehicle floating device based on load feedback as described above. The method includes the tracking operation steps:

1) placing two support plates of the same thickness on the active platform and the position-measuring platform respectively, and calibrating the collected data of the weighing sensor to 0;

2) placing the vehicle to be tested on the device, such that the chassis of the vehicle contacts with the active platform and the position-measuring platform in a symmetric manner, wherein the excitation side is set up close to the position-measuring platform;

3) during control of the half-vehicle floating and tracking, determining the operating frequency f of the inverter motor from the displacement and frequency of the half-vehicle sinusoidal excitation signal based on the tracking speed being equal to the maximum excitation speed;

4) collecting the measuring signal of the weighing sensors and determining a load identifying signal $\bar{p}$ according to an average value;

5) determining the position of the position-measuring platform relative to the vehicle's chassis, and controlling the inverter motor to operate and follow:

when the load identifying signal value is greater than 0 and not greater than a contact identifying upper limit $p_{sx}$, the inverter motor brakes; when the average measurement value of the weighing sensors is less than 0, the inverter motor reverses, driving the active platform up through the active triangle frame, and the active platform approaches the test frame; when the average measurement value of the weighing sensors is greater than the contact identifying upper limit $p_{sx}$, the inverter motor drives forward, driving the active platform down through the active triangle frame, and the active platform moves away from the test frame.

According to the half-vehicle position tracking method as described above, the operating frequency of the inverter motor in step (3) is determined as:

$$f = \frac{60FS}{k\left(L_1\sin\theta + L_2\cos\theta \frac{L_1\sin\theta + e}{\sqrt{L_2^2 - (L_1\sin\theta + e)^2}}\right)}$$

where f is the operating frequency of the inverter motor, F is the excitation frequency, S is the excitation displacement, k is the rotational speed conversion coefficient, L1 is the distance between the hinge center at the first corner of the active triangle frame and the hinge center at the second corner, L2 is the distance between the hinge centers at both ends of the active slider rod, e is the distance between the hinge center at the second corner of the active triangle frame and the vertical centerline of the active platform, and θ is the angle between a connection of the hinge center at the first corner of the active triangle frame to the hinge center at the second corner and the vertical direction.

According to the half-vehicle position tracking method as described above, the load identifying signal $\bar{p}$ in step (4) is calculated as follows:

$$\bar{p} = \frac{1}{3}\sum_{i=1}^{3} m_i$$

where $\bar{p}$ is the load identifying signal, and $m_i$ is the average measurement value of the ith sensor.

According to the half-vehicle position tracking method as described above, the contact identifying upper limit $p_{sx}$ is calculated as follows:

$$p_{sx} = (0.1 \sim 0.2)\frac{M}{n}$$

where M is the weight of the vehicle and n is the number of wheels.

Compared with the prior art, the invention has the tracking advantages:

1. the half-vehicle floating device based on load feedback according to the invention adopts a parallel four-bar structure to drive two crank sliders in symmetrical arrangement to realize the position synchronization when a real vehicle is excited. The structure is simple and reliable, and the mechanical synchronization precision is high;

2. the position tracking of the half-vehicle floating device based on load feedback according to the invention uses the load determination information on multi-point average load. According to the force feedback, the contact state is identified, and the motor drives the mechanism to realize the half-vehicle floating. The control response is fast, and the realization is simple and convenient;

3. the half-vehicle floating device based on load feedback according to the invention transfers torque by means of a power transfer block. The connection between the power transfer shaft and the active triangle frame is simple and it is convenient to disassemble;

4. the half-vehicle floating device based on load feedback according to the invention has a driving mode in which a right-angled reducer is connected to an inverter motor with brakes. It is flexible to arrange the device in space and the structure is compact.

Figure 1:
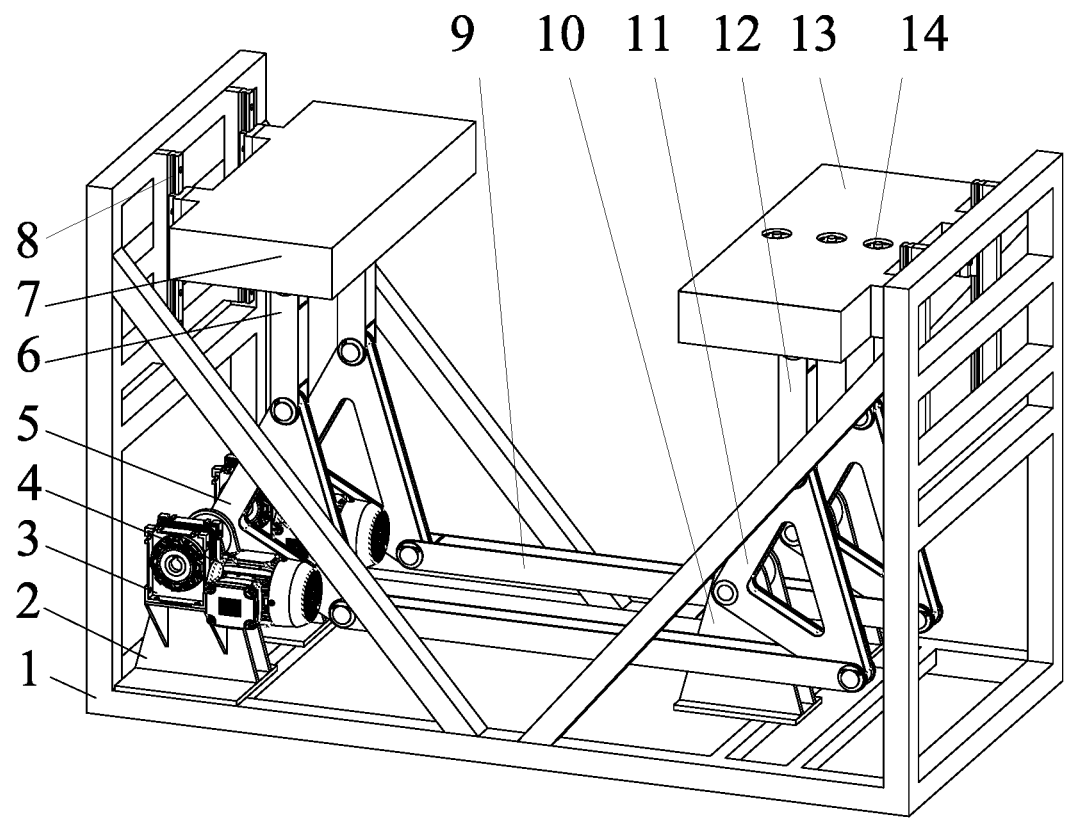
FIG. 1 is an isometric view of the invention.
Figure 2:
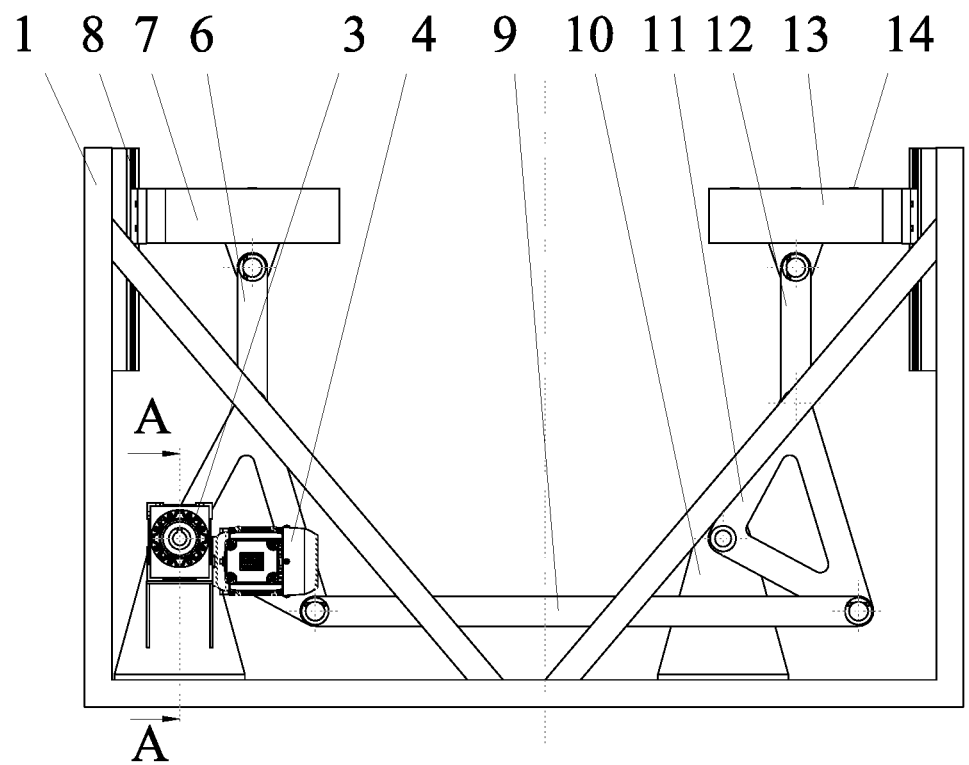
FIG. 2 is a front view of the invention.
Figure 3:
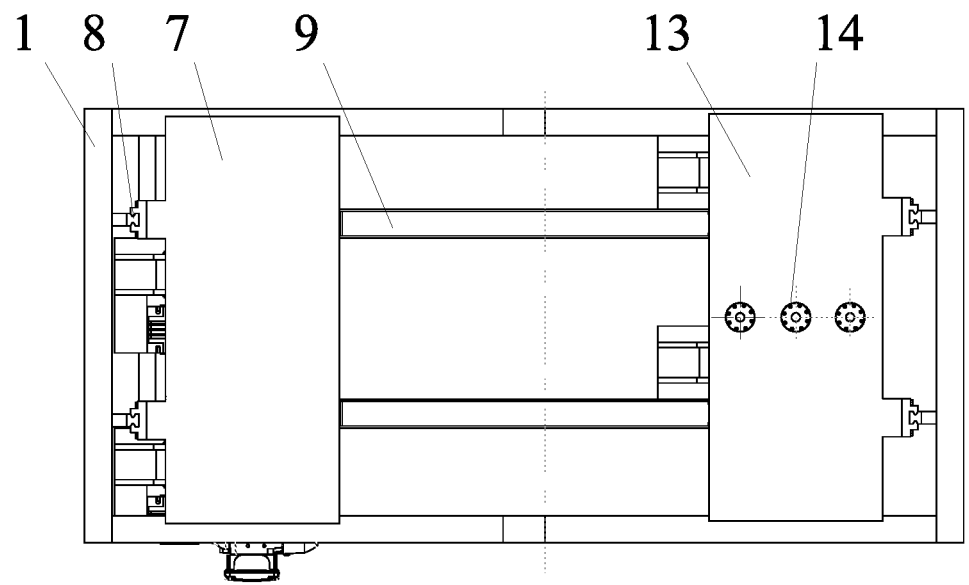
FIG. 3 is a top view of the invention.
Figure 4:
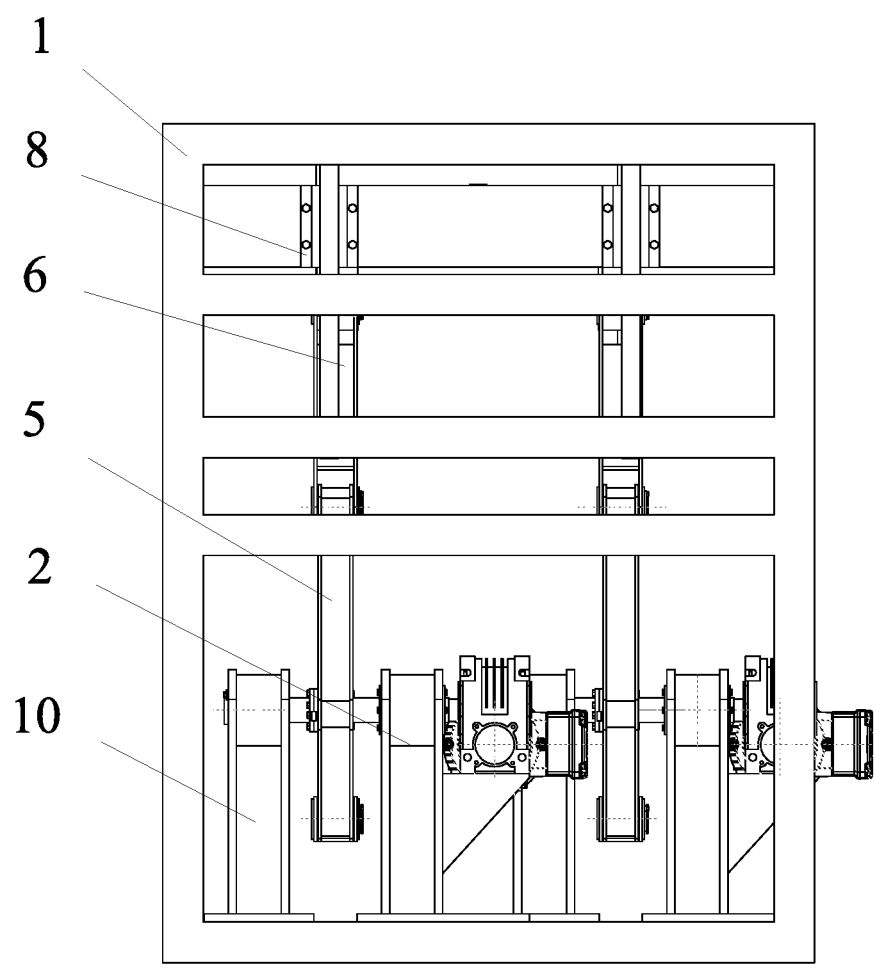
FIG. 4 is a right side view of the invention.
Figure 5:
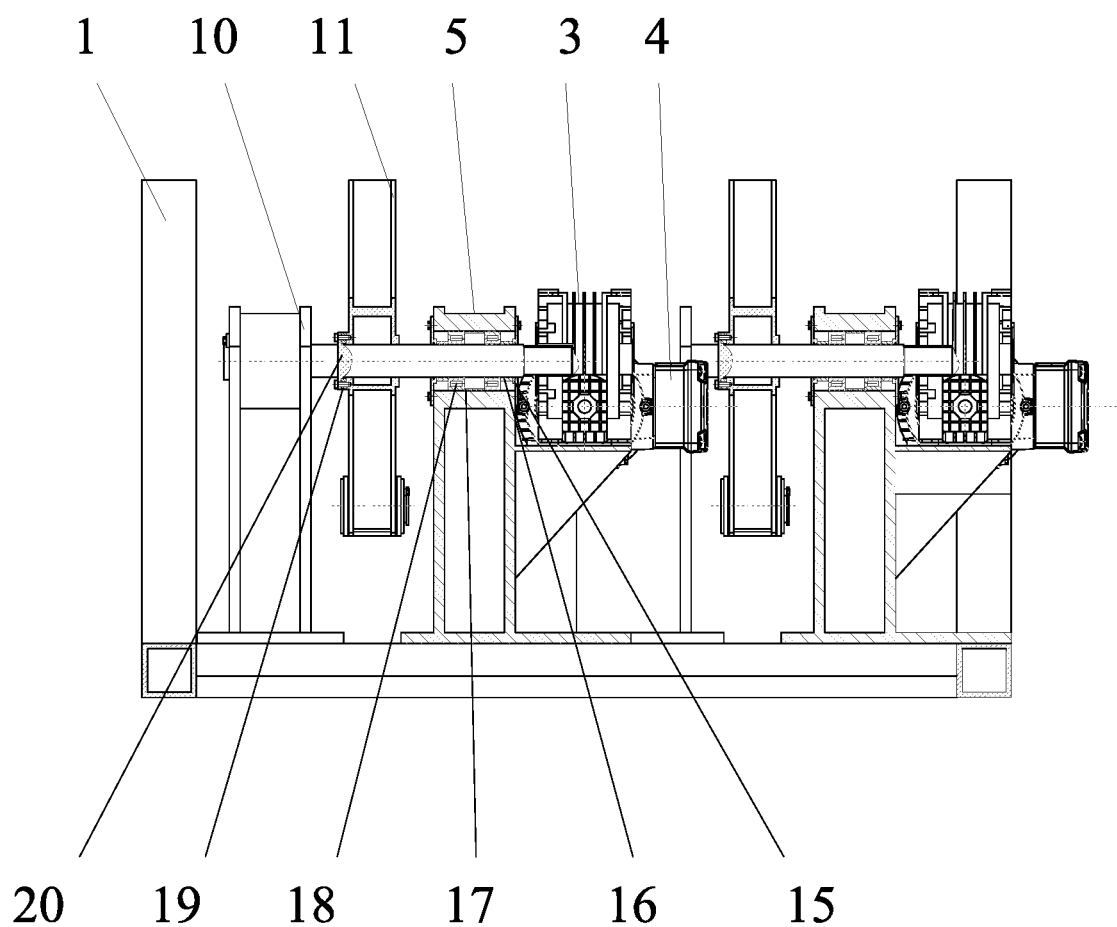
FIG. 5 is a sectional view of the invention taken along A-A line.
Figure 6:
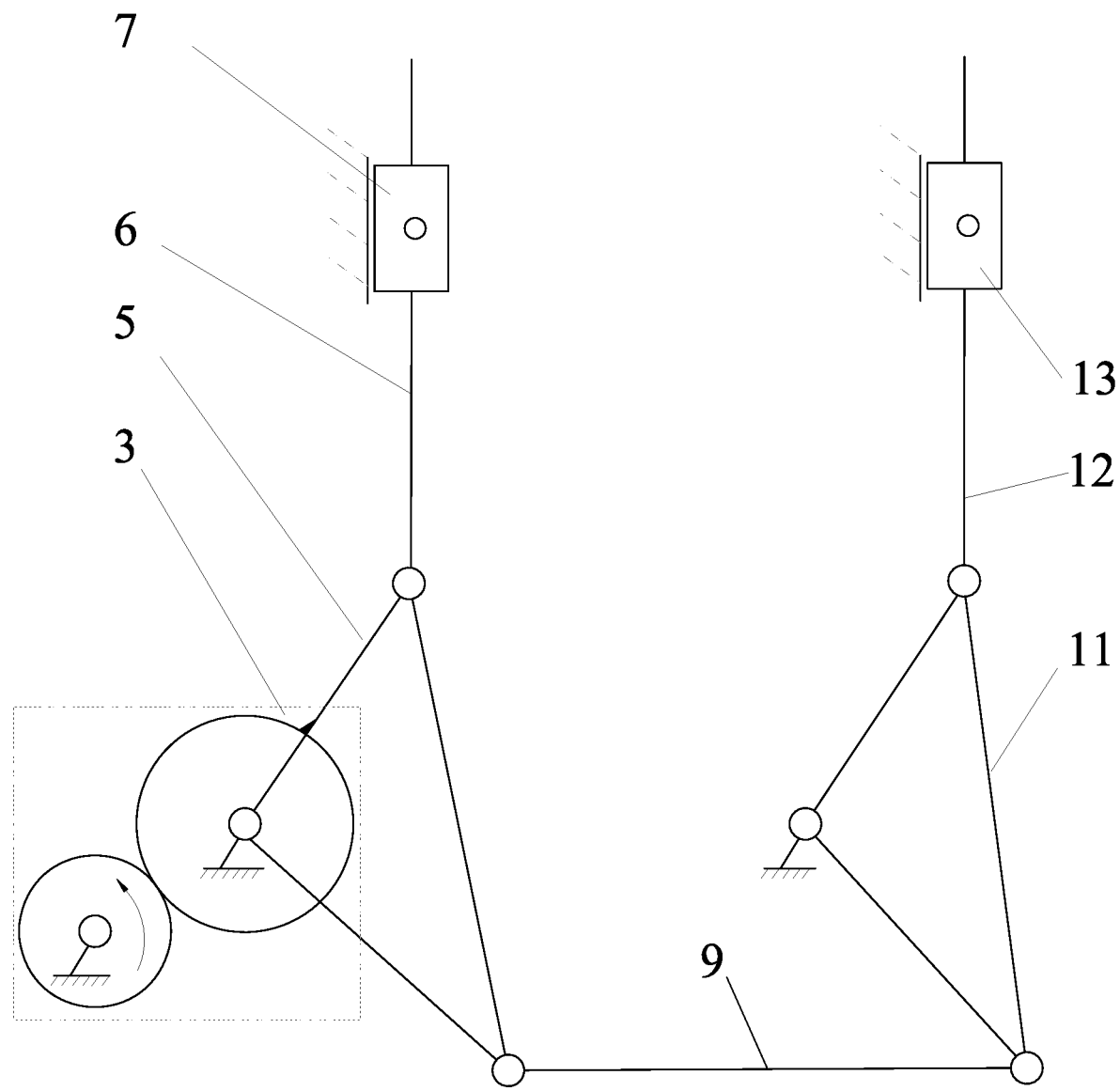
FIG. 6 is a schematic diagram of the operation according to the invention.

In the drawings:
1. rack, 2. active platform base, 3. right-angled reducer, 4. inverter motor with brakes, 5. active triangle frame, 6. active slider rod, 7. active platform, 8. linear ball guide, 9. parallel level, 10. position-measuring platform base, 11. position-measuring triangle frame, 12. position-measuring slider rod, 13. position-measuring platform, 14. weighing sensor, 15. end cap, 16. inner spacer of bearing, 17. outer spacer of bearing, 18. bearing, 19. power transfer mass, 20. power transfer shaft.

DETAILED DESCRIPTION OF EMBODIMENTS

The invention will be further explained in connection with the drawings.

As shown in FIGS. 1-6, the half-vehicle floating device based on load feedback according to the invention includes a rack 1, an active triangle frame 5, an active platform base 2, a tracking platform, a linear ball guide rails 8, a position-measuring platform base 10, a position-measuring triangle frame 11 and weighing sensor 14. The tracking platform includes an active platform 7 and a position-measuring platform 13. The rack 1 has a U-shaped cross section. Two linear ball guides 8 are provided vertically on opposite surfaces of the rack. The side surfaces of the active platform 7 and the position-measuring platform 13 facing away from each other are provided on corresponding linear ball guides 8 by sliders.

Two hinge ears are provided symmetrically at lower side of the active platform 7 and hinged to the upper end of two active slider rods 6 through pins. The lower end of the active slider rod 6 is hinged to the first corner of the active triangle frame 5 through a pin. The second corner of the active triangle frame 5 is hinged on the rack 1, and a flange is provided at the second corner. A pair of grooves is provided on the flange. A pair of grooves is provided correspondingly on the end of the power transfer shaft 20 towards the active triangle frame, and the power transfer shaft 20 is connected to the flange through a power transfer mass 19 which is arranged in the grooves of the power transfer shaft 20 and the flange. The power transfer shaft 19 is fitted with two bearings 18 which are mounted in a mounting hole of the base of active platform. An end cap 15 is mounted externally on both sides of the mounting hole and the end cap 15 is connected to the bearings 18 through an inner spacer of the bearing. The two bearings 18 are positioned through an outer spacer of the bearing 16. The other end of the power transfer shaft 19 is provided with a spline groove to which the output shaft of the right-angled reducer 2 is connected. The input shaft of the right-angled reducer 2 is connected to an inverter motor with brakes 4. The right-angled reducer 2 and the inverter motor 4 are mounted on the base 2 of the active platform, the bottom of which is fixed on the bottom 1 of the rack.

The bottom of the position-measuring platform 13 is also provided with two hinge ears which are hinged to an upper end of a position-measuring slider rod 12, respectively. The lower end of the position-measuring slider rod 12 is hinged to a first corner of the position-measuring triangle frame 11, and a second corner of the position-measuring triangle frame 11 is hinged to the base of the position-measuring platform 10 on the rack 1. A third corner of the active triangle frame 5 is hinged to an end of a pull rod 9, and the other end of the pull rod 9 is hinged to a corresponding third corner of the position-measuring triangle frame 11. Three weighing sensors 14 are provided on the position-measuring platform 13 and the sensors 14 are arranged evenly.

According to the half-vehicle position tracking method in the invention, the operation steps include:

1) Placing two support plates of the same thickness on the active platform 7 and the position-measuring platform 13 respectively, and calibrating the collected data of three weighing sensors 14 to 0. Placing the vehicle to be tested on the device, such that the chassis of the vehicle contacts with the active platform 7 and the position-measuring platform 13 in a symmetric manner, wherein the excitation side is set up close to the position-measuring platform 13.

Figure 7:
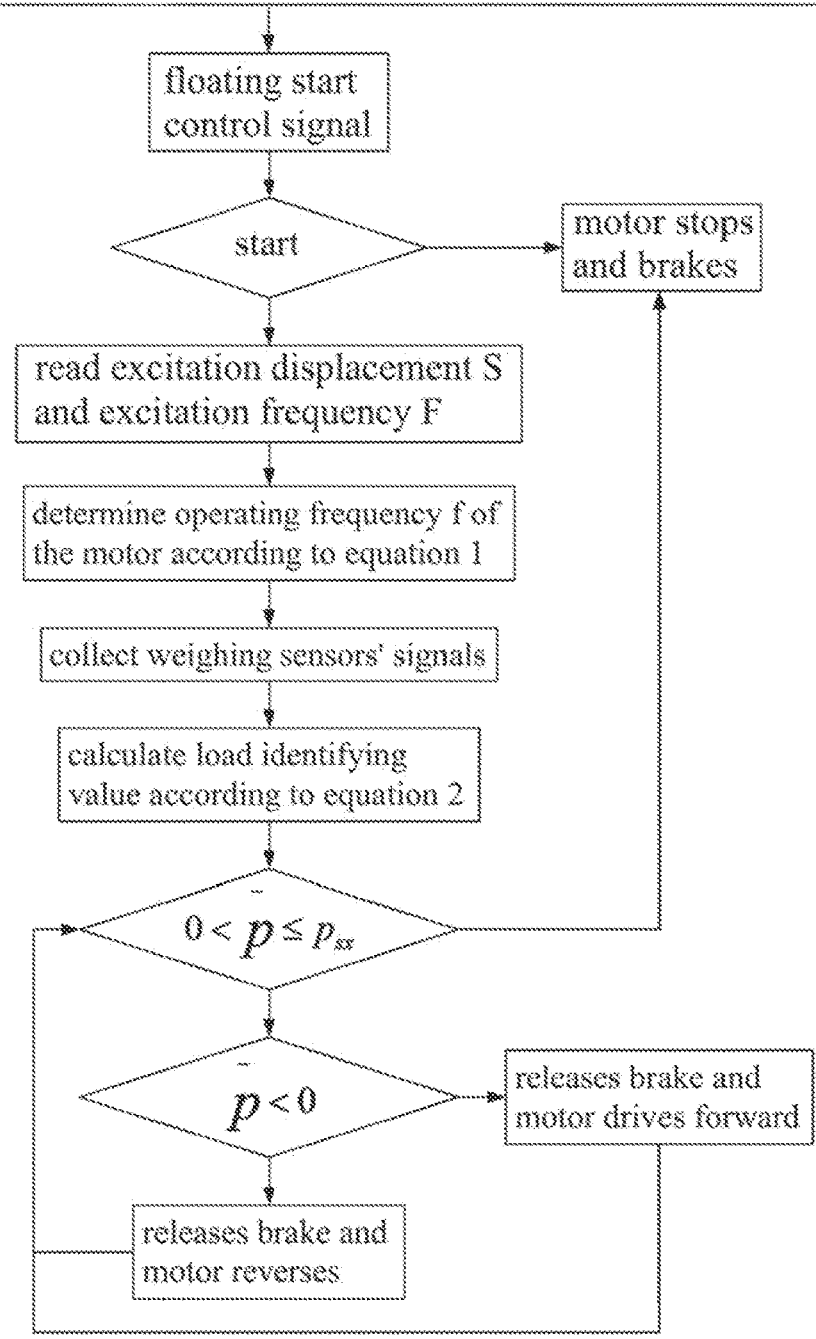
FIG. 7 is a flow chart of the half-vehicle position tracking method according to the invention.

2) Shown in FIG. 7, during control of the half-vehicle floating and tracking, determining the operating frequency f of the inverter motor from the displacement and frequency of the half-vehicle sinusoidal excitation signal based on the tracking speed being equal to the maximum excitation speed:

$$f = \frac{60FS}{k\left(L_1\sin\theta + L_2\cos\theta \frac{L_1\sin\theta + e}{\sqrt{L_2^2 - (L_1\sin\theta + e)^2}}\right)}$$

where f is the operating frequency of the inverter motor, F is the excitation frequency, S is the excitation displacement, k is the rotational speed conversion coefficient, L1 is the distance between the hinge center at the first corner of the active triangle frame and the hinge center at the second corner, L2 is the distance between the hinge centers at both ends of the active slider rod, e is the distance between the hinge center at the second corner of the active triangle frame and the vertical centerline of the active platform, and θ is the angle between a connection of the hinge center at the first corner of the active triangle frame to the hinge center at the second corner and the vertical direction.

3) Collecting measuring signals from the weighing sensors 14 and calculating a load identifying signal $\bar{p}$ according to an average value as follows:

$$\bar{p} = \frac{1}{3}\sum_{i=1}^{3} m_i$$

where $\bar{p}$ is the load identifying signal, and $m_i$ is the average measurement value of the ith sensor.

4) Determining the position of the position-measuring platform 13 relative to the vehicle's chassis. When the load identifying signal value is greater than 0 and not greater than a contact identifying upper limit $p_{sx}$, the inverter motor with brakes 4 brakes and stops. When the load identifying signal value is less than 0, the brake of the inverter motor with brakes 4 releases and the inverter motor 4 reverses, driving the active platform 7 up through the active triangle frame 5, and the active platform 7 approaches the test frame. When the load identifying signal value is greater than the contact identifying upper limit $p_{sx}$, the brake of the inverter motor with brakes 4 releases and the inverter motor with brakes 4 drives forward, driving the active platform 7 down through the active triangle frame 5, and the active platform 7 moves away from the test frame. The contact identifying upper limit $p_{sx}$ is calculated as follows:

$$p_{sx} = (0.1 \sim 0.2)\frac{M}{n}$$

where M is the weight of the vehicle and n is the number of wheels.

What is claimed is:

1. A half-vehicle floating device based on load feedback, comprising a rack, an active triangle frame, an active platform, guide rails, a position-measuring triangle frame and a position-measuring platform;
    guide rails corresponding to the active platform and the position-measuring platform are provided vertically on the rack;
    the active platform and the position-measuring platform are respectively placed on a corresponding rail through a slider;
    the bottom of the active platform is hinged to an upper end of an active slider rod, a lower end of the active slider rod is hinged to a first corner of the active triangle frame, and a second corner of the active triangle frame is hinged to the rack and connected to an inverter motor through a transmission device;
    the bottom of the position-measuring platform is hinged to an upper end of a position-measuring slider rod, a lower end of the position-measuring slider rod is hinged to a first corner of the position-measuring triangle frame, and a second corner of the position-measuring triangle frame is hinged to the rack;
    a third corner of the active triangle frame is hinged to an end of a pull rod, and the other end of the pull rod is hinged to a third corner of the position-measuring triangle frame; and
    a plurality of weighing sensors are provided on the position-measuring platform.

2. The half-vehicle floating device of claim 1, wherein the plurality of weighing sensors are arranged evenly in the middle of the position-measuring platform.

3. The half-vehicle floating device of claim 1, wherein the transmission device comprises a flange, a power transfer shaft and a right-angled reducer; wherein the flange is mounted at the second corner of the active triangle frame, and one end of the power transfer shaft is connected to the flange, the other end of the power transfer shaft is connected to the output shaft of the right-angled reducer, and the input shaft of the right-angled reducer is connected to the inverter motor.

4. The half-vehicle floating device based on load feedback of claim 3, wherein a pair of grooves is provided on the flange, and a pair of grooves is provided correspondingly on the end of the power transfer shaft facing the active triangle frame; wherein the power transfer shaft is connected to the flange through a power transfer mass arranged in the grooves of the flange and the power transfer shaft.

5. The half-vehicle floating device based on load feedback of claim 3, wherein the right-angled reducer and the inverter motor are mounted on a base of the active platform; wherein the bottom of the base of the active platform is fixed at the bottom of the rack, and the guide rails are linear ball guide rails and the inverter motor is an inverter motor with brakes.

6. A half-vehicle position tracking method using the half-vehicle floating device based on load feedback of claim 1, comprising:
1) placing two support plates of the same thickness on the active platform and the position-measuring platform respectively, and calibrating collected data of the weighing sensors to 0;
2) placing the vehicle to be tested on the device, such that the chassis of the vehicle is in contact with the active platform and the position-measuring platform in a symmetric manner, wherein an excitation side is provided close to the position-measuring platform;
3) determining the operating frequency f of the inverter motor from the displacement and frequency of the half-vehicle sinusoidal excitation signal based on the tracking speed being equal to the maximum excitation speed during control of the half-vehicle floating and tracking;
4) collecting measuring signal of the weighing sensors and determining a load identifying signal $\bar{p}$ according to an average value;
5) determining a relative position between the position-measuring platform and the chassis, and controlling the inverter motor to operate and track:
when the load identifying signal value is greater than 0 and not greater than a contact identifying upper limit $p_{sx}$, the inverter motor brakes and stops; when the average measurement value of the weighing sensors is less than 0, the inverter motor reverses, driving the active platform up through the active triangle frame, and the active platform approaches the test frame; when the average measurement value of the weighing sensors is greater than the contact identifying upper limit $p_{sx}$, the inverter motor drives forward, driving the active platform down through the active triangle frame, and the active platform moves away from the test frame.

7. The half-vehicle position tracking method of claim 6, wherein the operating frequency of the inverter motor in step (3) is determined as:

$$f = \frac{60FS}{k\left(L_1\sin\theta + L_2\cos\theta \frac{L_1\sin\theta + e}{\sqrt{L_2^2 - (L_1\sin\theta + e)^2}}\right)};$$

wherein f is the operating frequency of the inverter motor, F is the excitation frequency, S is the excitation displacement, k is the rotational speed conversion coefficient, L1 is the distance between the hinge center at the first corner of the active triangle frame and the hinge center at the second corner, L2 is the distance between the hinge centers at both ends of the active slider rod, e is the distance between the hinge center at the second corner of the active triangle frame and the vertical centerline of the active platform, and θ is the angle between a connection of the hinge center at the first corner of the active triangle frame to the hinge center at the second corner and the vertical direction.

8. The half-vehicle position tracking method of claim 6, wherein the load identifying signal $\bar{p}$ in step (4) is calculated as follows:

$$\bar{p} = \frac{1}{3}\sum_{i=1}^{3} m_i$$

where $\bar{p}$ is the load identifying signal, and $m_i$ is the average measurement value of the $i_{th}$ sensor.

9. The half-vehicle position tracking method of claim 6, wherein the contact identifying upper limit $p_{sx}$ is calculated as follows:

$$p_{sx} = (0.1 \sim 0.2)\frac{M}{n}$$

where M is the weight of the vehicle and n is the number of wheels.

* * * * *